3,155,459
Patented Nov. 3, 1964

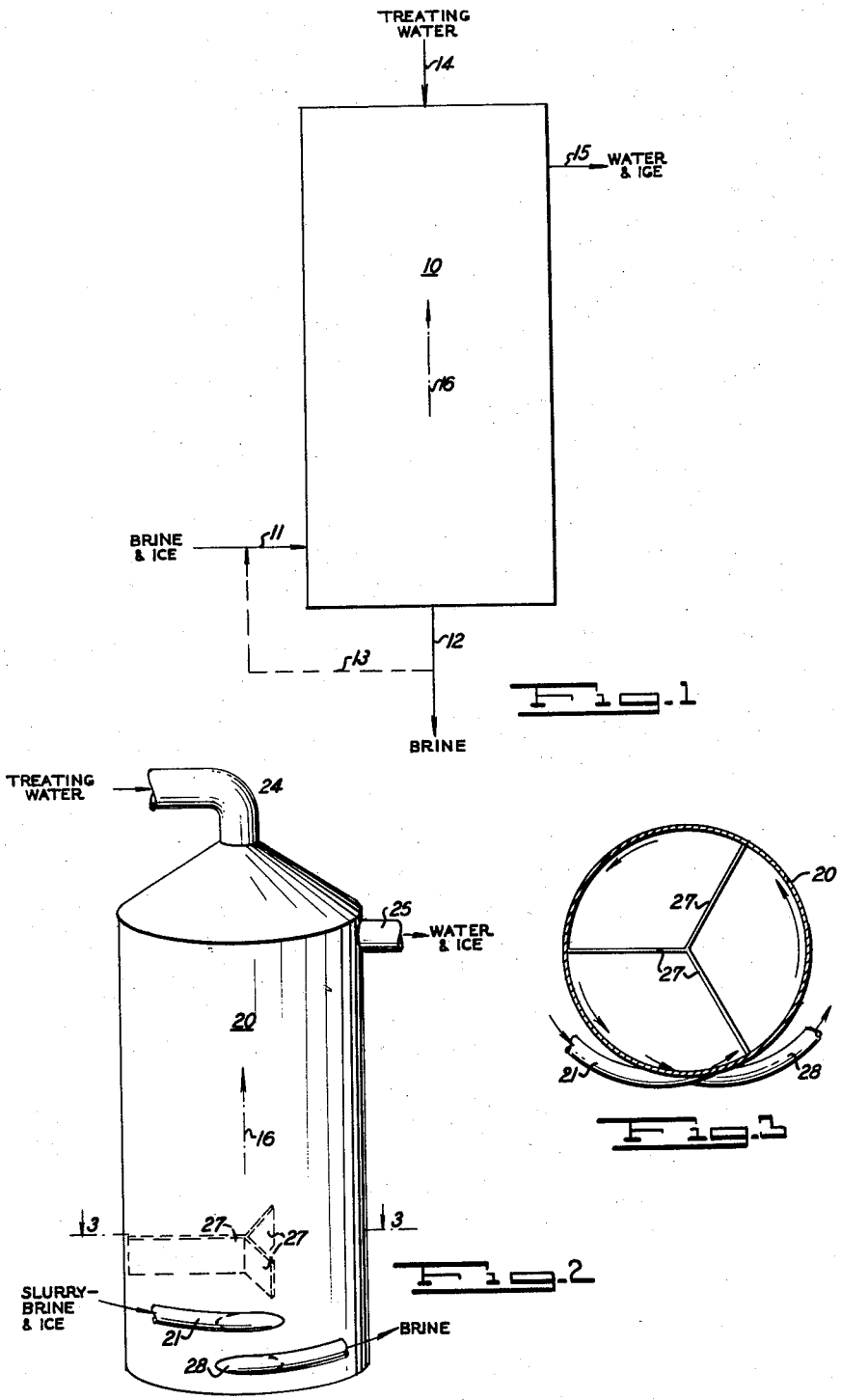

3,155,459
SEPARATING BRINE FROM ICE CRYSTALS
David Brown, Milbrook, Conn., John White Colton, Pelham Manor, N.Y., and Sherwood N. Fox, Stamford, Conn., assignors to Halcon International, Inc., a corporation of Delaware
Filed Feb. 9, 1961, Ser. No. 88,050
2 Claims. (Cl. 23—310)

This invention relates to processes for treating solutions in order to separate solvent therefrom, more particularly to such processes for preparing fresh or potable water from sea water or brackish water, wherein the saline water is partially frozen, the resulting ice is separated from the remaining salt water, and this ice is melted to give fresh or potable water, and especially to such processes wherein most of the brine is drained from the crystals and the latter are contacted in counter-current manner with liquid of progressively lower salinity to separate residual saline liquid from and give an aqueous slurry which when melted is of less than 500 p.p.m. salinity. It also relates to apparatus for separating and washing the crystals.

Various proposals have been made for recovering potable water from sea water or the like materials (of over 500 p.p.m. salinity), including direct or indirect cooling and freezing and separation of frozen, relatively pure water from the more concentrated liquid saline water. These processes are relatively costly, require costly apparatus, and also leave much to be desired in the washing or separation steps of removing saline water from the frozen water. The art is confronted by the problem of providing processes and means for recovery of fresh or potable water from saline water in an economical manner and with commercially attractive separation efficiencies.

The discoveries associated with the invention and relating to the solution of the above problems, and the objects achieved in accordance with the invention as set forth herein include the provision of:

In a process for the production of fresh water from saline water including the steps of freezing a part of the latter and separating the resulting crystals from the residual liquid, the improvement which comprises separating a substantial part of the residual liquid from the crystals and contacting the latter with liquid of progressively lower salinity to separate residual saline liquid therefrom and provide a product which when melted gives water of less than 500 p.p.m. salinity, the average particle diameter of the ice crystals being greater than 0.3 mm. and the average concentration of ice in the slurry within the contacting zone being less than 30% by weight;

Such a process wherein a slurry containing 10 to 30% of ice is produced;

Such a process wherein the ice flows upward and treating water flows downward and there is a net downward flow of 3 to 6% of water based on the weight of product;

Such a process wherein the feed rate is about 970 lbs./min. and the product is produced at a rate of about 291 lbs./min.;

An apparatus useful for the separation of washed ice from a slurry thereof in salt water comprising an enclosure having a slurry feed means at one zone thereof and wash water feed means at another zone thereof, the zones being oriented so that ice flows from the former to the latter, and product removal means at the latter zone;

Such an apparatus in the form of a vertical cylinder wherein the slurry feed means is tangential and at the lower region, and baffles are provided in the path of flow of the ice, said baffles being flat and substantially parallel to said path;

And other objects which will be apparent as details or embodiments of the invention are set forth hereinafter.

In accompanying drawing, FIGURE 1 schematically illustrates the process of the invention, FIGURE 2 is a perspective view of a separator of the invention, and FIGURE 3 is a cross-sectional view along lines 3, 3 of FIGURE 2.

Referring to FIGURE 1 a slurry of ice and brine is introduced into vessel 10 via line 11. Brine drains and flows downward via line 12 (some brine may be recycled via line 13 to line 11, if desired). Wash water is introduced via line 14, and there is a small net downward flow thereof. Ice particles (arrow 16) rise in the vessel and brine is washed therefrom by the liquid flowing downward. A slurry of ice and water is removed via line 15, and when melted gives potable water.

FIGURE 2 shows a separator vessel 20 provided with slurry feed inlet 21 set tangentially to the vessel, water feed 24, and baffles 27 arranged vertically and at equal angles (as shown in FIGURE 3 which is a cross-sectional view taken along lines 3, 3 of FIGURE 2) which prevent swirling of the liquid mass in the contact zone. The ice tends to move toward the center and rise in the column, and is drawn off as a slurry via line 25. The column may be of any convenient shape, and a vertical cylindrical shape is preferred. The brine is withdrawn via line 28 set below the feed; i.e. in the brine separation zone.

In order to indicate still more fully the nature of the present invention, the following examples of typical procedures are set forth in which parts and percents mean parts and percents by weights, respectively, it being understood that these examples are presented as illustrative only and they are not intended to limit the scope of the invention.

*Example 1*

A slurry of (70 parts) brine at five percent salt concentration and (30 parts) crystals of substantially pure ice (of 0.8 mm. average diameter particle size) is fed to the lower region of a separator, where brine is removed downwardly except for the film remaining on the crystals which rise to the top region and are separated as a slurry in water. The interstices between the crystals are filled with fluid of progressively lower salinity as they travel upwardly. Water is fed at the top region and most of it forms a slurry with the ice and is removed from the top region. A small portion of the wash water, e.g., about 5% based on the weight of product, is passed downward to ensure low enough salinity in the top region so that the slurry removed gives water of less than 500 p.p.m. salinity when melted.

The ice rises at an average rate of about 0.04 ft./sec., and the average concentration of ice in the column is about 20%.

The flow rate of the feed is about 970 lbs./min. for a 4 ft. diameter vertical cylindrical vessel holding about 2000 gallons of fluid or slurry, the total water feed rate is about 750 lbs./min. and about 320 lbs./min. of potable water is produced.

The process may be carried out in a semi-continuous or a continuous manner.

*Example 2*

The procedure of Example 1 is repeated except the separator is provided with baffles and a tangential slurry feed as shown in FIGURES 2, 3 and 4 process is carried on continuously and similar results are obtained, except that the product is of lower salinity.

Comparable results to the foregoing are achieved with various modifications thereof, including the following. It is essential that the mass of crystals or solid particles be open or uncaked and that the interstices therebetween be filled with liquid. Essentially the system contains a continuous liquid phase partially filled with the solid particles, and these particles move up through liquid of progressively lower salinity. The actual size or average diameter of the solid particles should be sufficient to permit a loose enough arrangement of the particles so as to permit substantially complete removal of excess brine therefrom under the conditions existing in the separation means. Relatively large and chunky crystals are preferred. A substantial part of the surface of the individual particles should be exposed to the wash liquor. The brine is loosened and removed from the individual crystals and from the mass of particles, leaving only a water of relatively low salinity on the crystal.

The slurry feed flow may be in the range of about 50 to 50,000 lbs./min. for each 1,000 gallon zone, the slurry in the column may contain about 10 to 30% of ice and the water feed rate may be in the range of about 35 to 3,500 lbs./min. Higher downflows may be used, but are contra-indicated for economic reasons.

Generally, 200 to 20,000 lbs. of ice (or potable water, when melted) per hour may be produced for 1 sq. ft. of column cross section.

Although any crystal size or average diameter (which can be separated from residual liquid) may be used in accordance with the invention, it is preferred to use relatively large or chunky particles having a low ratio of surface to volume. A desirable size or average diameter is at least about 0.3 mm., a preferred size is about 0.4 to 3.0 mm., and such sizes as 0.5, 0.65, 0.8, or 1.0 mm. average diameters are of commercial interest. The preparation of such crystals is set forth in detail in U.S. patent application Serial No. 48,624, filed August 10, 1960, as is an overall water separation process.

It is to be noted that the present process is so efficient that the usual filtration or the like separation means is avoided.

In view of the foregoing disclosures, variations and modifications thereof will be apparent to one skilled in the art, and it is intended to include within the invention all such variations and modifications except as do not come within the scope of the appended claims.

What is claimed is:

1. A process for the production of a fresh water product from a slurry of ice crystals having an average particle diameter of greater than 0.3 mm. and brine which comprises: introducing said slurry tangentially into a separating zone; separating a substantial portion of said brine; upwardly flowing the remaining ice crystals and residual brine into the lower portion of a washing zone; downwardly flowing wash water into the upper portion of said zone; countercurrently contacting said ice crystals with said wash water; maintaining less than 30% by weight of said ice crystals in said washing zone and a net downflow of wash water of from 3 to 6% based on weight of product; and withdrawing from said upper part of said zone a fresh water product of ice crystals and water having a salinity of less than 500 p.p.m.

2. An apparatus useful for the separation of washed ice from a slurry in salt water comprising a vertical cylindrical enclosure, tangential slurry feed means at the lower part of said enclosure, concentrated brine withdrawal means at the lower part of said enclosure below the said slurry feed means, vertical baffle means in said enclosure above said slurry feed means adapted to prevent liquid swirling in said enclosure above said baffle, wash water feed means at the upper part of said enclosure, and ice crystal withdrawal means at the upper part of said enclosure.

References Cited in the file of this patent
UNITED STATES PATENTS

| | | |
|---|---|---|
| 2,315,762 | Ax et al. | Apr. 6, 1943 |
| 2,539,019 | Hill | Jan. 23, 1951 |
| 2,874,118 | Albertsen | Feb. 17, 1959 |
| 3,012,409 | Ashley | Dec. 12, 1961 |
| 3,049,889 | Carfagno | Aug. 21, 1962 |
| 3,062,626 | Beck | Nov. 6, 1962 |

FOREIGN PATENTS

| | | |
|---|---|---|
| 70,507 | Norway | June 3, 1946 |
| 1,065,207 | France | Jan. 6, 1954 |

OTHER REFERENCES

Gilliland: "Fresh Water for the Future," Industrial and Engineering Chemistry, volume 47, number 12, December 1955, pages 2410–2422.